Jan. 1, 1957  R. L. MARINO  2,776,146
ADJUSTABLE HEIGHT LOAD BED FOR VEHICLES
Filed July 6, 1955  2 Sheets-Sheet 1
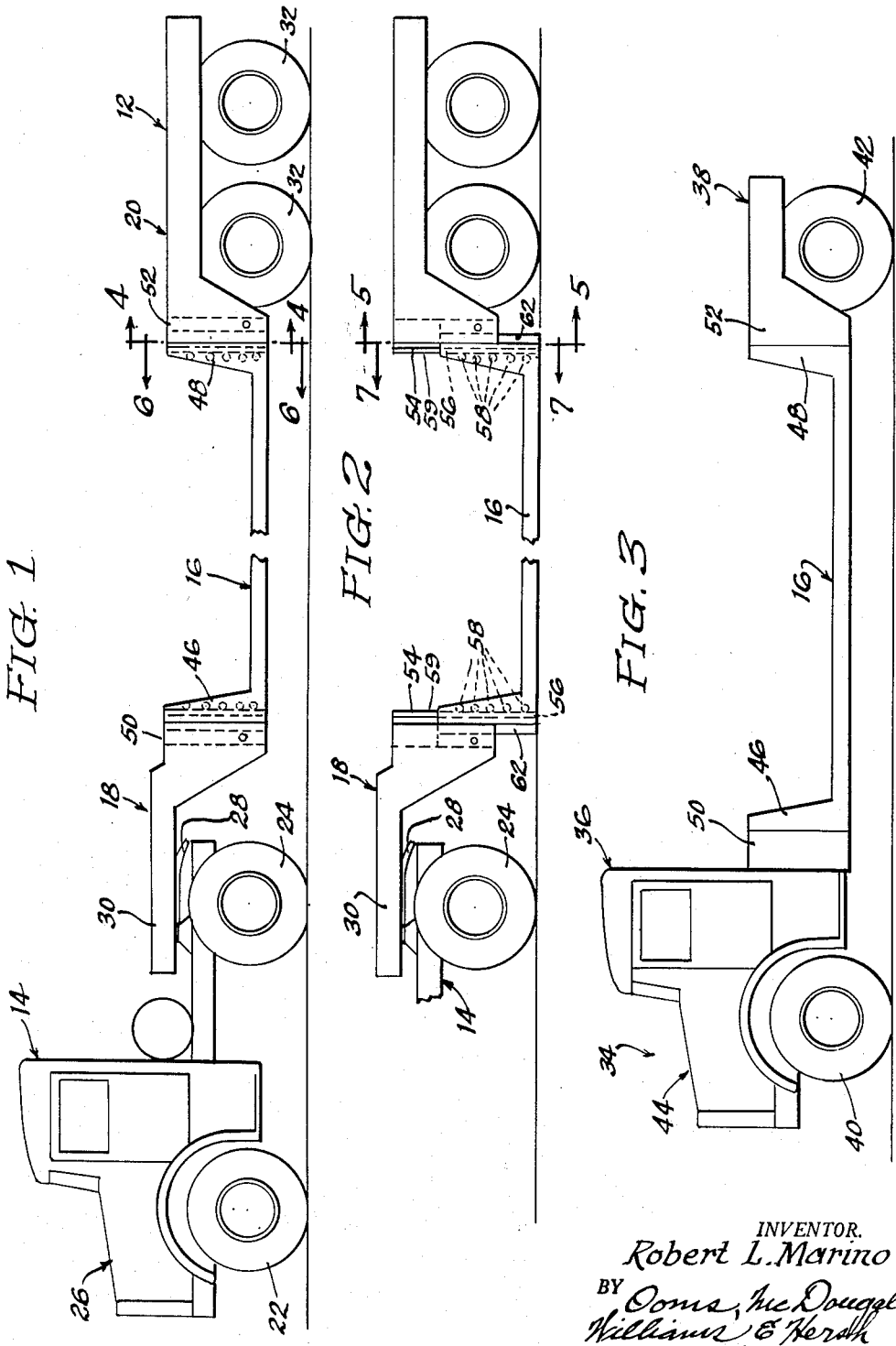
INVENTOR.
Robert L. Marino
BY Ooms, McDougall,
Williams & Hersh
Attorneys Jan. 1, 1957  R. L. MARINO  2,776,146
ADJUSTABLE HEIGHT LOAD BED FOR VEHICLES
Filed July 6, 1955  2 Sheets-Sheet 2

INVENTOR.
Robert L. Marino
BY
Ooms, McDougall,
Williams & Hersh
Attorneys

United States Patent Office 2,776,146
Patented Jan. 1, 1957

2,776,146

ADJUSTABLE HEIGHT LOAD BED FOR VEHICLES

Robert L. Marino, Delavan, Wis.

Application July 6, 1955, Serial No. 520,333

9 Claims. (Cl. 280—44)

This invention relates to heavy-duty trailers and trucks, adapted to carry construction machinery and other heavy equipment.

One principal object of the invention is to provide a semi-trailer truck or other vehicle having a new and improved arrangement whereby the load-carrying bed of the vehicle may be lowered and raised so that heavy machinery or the like may readily be loaded on the bed with the bed lowered to the ground, whereupon the bed may be raised to its normal position for transporting the equipment along the highways.

A further object is to provide a new and improved load-carrying bed which is adjustable in height and is adapted to be employed on a truck, trailer, semi-trailer, or any other type of vehicle.

It is another object to provide an arrangement of the foregoing character in which the load bed is positively guided for vertical movement and is adapted to be raised and lowered in a new and improved manner by a powerful mechanism of rugged construction.

A further object is to provide an adjustable load bed arrangement of the foregoing character which is arranged in a new and improved manner to minimize frictional resistance to the raising and lowering of the bed.

Another object is to provide a new and improved load bed arrangement which is long lasting and effective in operation yet is simple in construction and low in cost.

Further objects and advantages of the invention will appear from the following description, taken with the accompanying drawings, in which:

Figure 1 is a side elevational view of an illustrative semi-trailer equipped with an adjustable load bed arrangement, constructed in accordance with the invention, the trailer being shown with its front end hitched to a tractor-type truck;

Fig. 2 is a fragmentary side elevational view similar to Fig. 1 but with the adjustable load bed in its fully lowered position rather than fully raised, as in Fig. 1;

Fig. 3 is a side elevational view of a modified arrangement in which the invention is applied to a truck rather than a semi-trailer;

Figure 4:
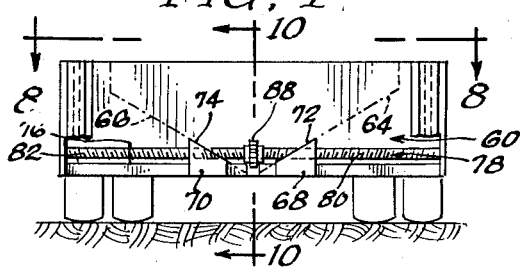
Figure 6:
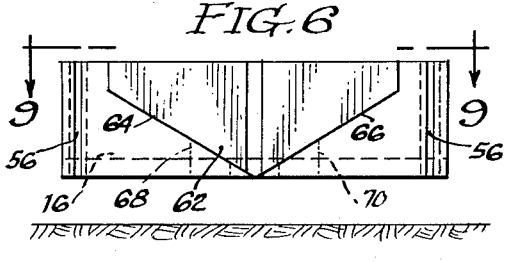
Figure 7:
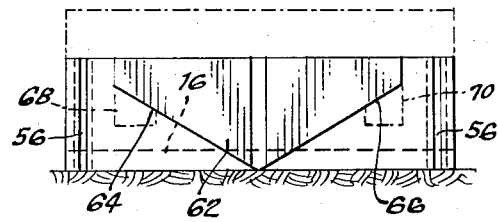
Figure 8:
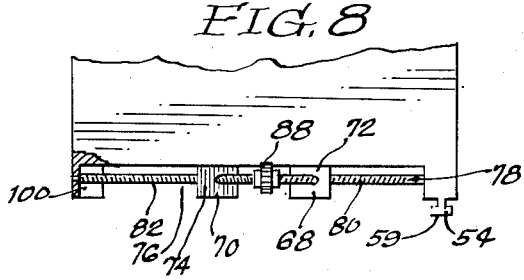
Figure 9:
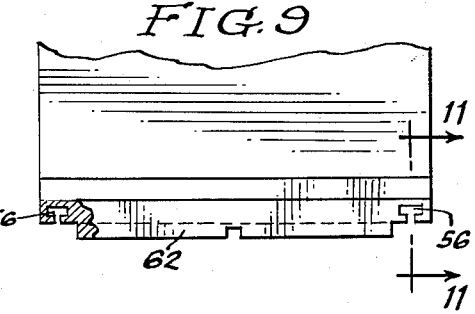
Figure 10:
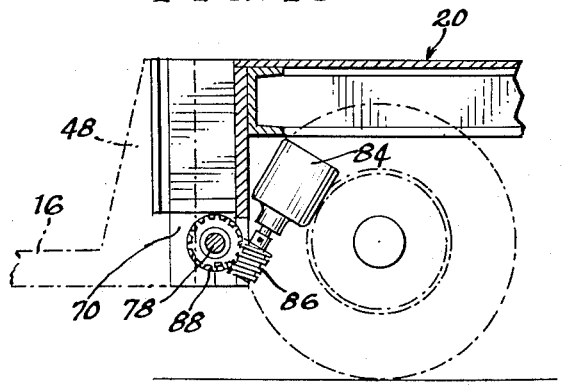
Figure 11:
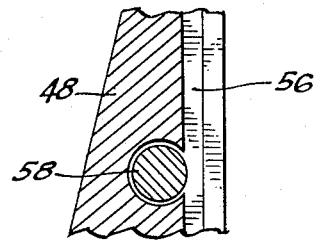

Figs. 4–7 are transverse vertical sectional views which are taken along lines 4—4, 5—5, 6—6 and 7—7 of Figs. 1 and 2, to illustrate a mechanism for raising and lowering the load bed;

Figs. 8 and 9 are fragmentary plan views, taken as indicated by lines 8—8 and 9—9 in Figs. 4 and 6;

Fig. 10 is a fragmentary vertical sectional view taken generally along a line 10—10 in Fig. 4; and Fig. 11 is a fragmentary enlarged vertical sectional view taken along a line 11—11 in Fig. 9.

In hauling construction machinery from one construction site to another, it is desirable to provide a vehicle, such as a semi-trailer or a heavy-duty truck, upon which the machine may readily be loaded. The hauling vehicle should be arranged so that wheeled or tracked construction machines may be driven, under their own power, on and off the vehicle, without any necessity for providing any special ramp or the like. In the case of other heavy equipment, not provided with wheels or tracks, it is desirable to provide a hauling vehicle having an extremely low, load-carrying bed so that the equipment may be loaded on the bed with the greatest possible ease. Fulfilling these needs in a new and improved manner is the primary objective of the present invention.

If the drawings are considered in greater detail it will be seen that Fig. 1 illustrates a load-carrying vehicle in the form of a semi-trailer 12, adapted to be hitched or coupled to a tractor-type truck 14, or some other suitable tractive vehicle. As shown, the trailer 12 is provided with a load-carrying bed 16 which may be raised and lowered relative to front and rear supporting members 18 and 20. As illustrated, the bed 16 is of a low-slung type adapted to carry machinery or the like, for example, but the bed may be of any other suitable type, such as beam-type or cargo-type, for example. The load bed 16 may be lowered from its normal position, shown in Fig. 1, to a position with the load bed against the ground, as shown in Fig. 2. With the load bed 16 thus lowered, any of the usual tracked or wheeled machines may be driven on the load bed 16 under their own power, if the machines are self-propelled, or may readily be pulled onto the load bed, if the machines are of the trailing type. In most cases it will not be necessary to provide any loading ramp. If a loading ramp proves to be necessary in any particular case, the ramp may be of the simplest possible construction.

Other heavy equipment, not provided with wheels, may be loaded on the trailer 12 with the maximum possible ease, with the load bed 16 lowered to the ground. A minimum of lifting will be involved in loading the equipment. Once the machine or other equipment has been loaded on the trailer 12, the load bed 16 may be raised to its normal position, as shown in Fig. 1, so that the trailer 12 may be towed along the highways.

It will be seen that the illustrated tractor 14 is of the usual type, having front and rear wheels 22 and 24. Either or both sets of wheels may be driven by any suitable power means, such as an engine 26. A swivel, or fifth wheel 28, is mounted on the rear of the tractor 14 to provide support for the trailer 12.

In this instance, the front supporting member 18 of the trailer 12 is provided with a gooseneck 30, or other hitching member, adapted to be connected to the fifth wheel 28. Two or more wheels 32 are mounted on the rear supporting member 20. The wheels 32 may be power-driven, if this is desired.

Fig. 3 illustrates an application of the invention to a heavy-duty truck 34. The load bed 16 of the truck 30 may be the same as in Figs. 1 and 2. However, the truck 34 is provided with modified front and rear supporting members 36 and 38, both of which are provided with ground-engaging wheels 40 and 42. It will be seen that the front vehicle member 34 takes the form of a two-wheeled power unit having an engine 44, which may be utilized to drive either or both of the front and rear wheel sets 40 and 42. It will be understood that the front wheels 40 may be driven mechanically, while the rear wheels 42 may be driven by an electric or hydraulic type drive. In the modified embodiment of Fig. 3, the load bed 16 serves as a rigid interconnecting member between the wheeled front and rear units 36 and 38. However, the load bed 16 may be lowered and raised, as in the embodiment of Figs. 1 and 2, in the manner now to be described.

The load bed 16 of Figs. 1 and 2 is connected to the trailer 12 in such a manner that the load bed may be adjusted vertically, yet will serve as a connecting member between the front and rear vehicle units 18 and 20. To this end, the load bed 16 is provided with front and rear portions 46 and 48, by which sliding connections are made with mating portions 50 and 52 on the vehicle members 18 and 20. The portions 46 and 48 may be identical. Likewise, the portions 50 and 52 may be alike. Accordingly, it will suffice to describe the rear connecting portions 48 and 52. These portions are formed, in this instance, with interengaging male and female guide elements 54 and 56 which may be T-shaped in cross-section, as illustrated, or may assume various other forms. The illustrated male guide elements 54 consist of vertically extending T-members or guides which are mounted adjacent the opposite sides of the vehicle unit 20. It will be seen that the illustrated female guide elements 56 comprise vertical T-slots formed in the end portion 48 of the load bed 16. To minimize frictional resistance to vertical movement of the load bed 16, the end portion 48 may be fitted with a plurality of rollers 58 (Figs. 2 and 11), projecting slightly into the T-slots 56 for engagement with the T-members 54. More specifically, the rollers 58 engage flat vertical surfaces 59, constituting the outer faces of the T-members 54. The illustrated rollers greatly minimize the resistance to sliding movement between the guide elements 54 and 56. It will be understood that additional rollers may be provided along the other surfaces of the slots 56, if desired.

While the T-guides 54 and 56 permit vertical movement of the load bed 16, they maintain angular alinement between the load bed and the vehicle units 18 and 20. In other words, the load bed 16 is equivalent to a rigid connection between the front and rear vehicle units 18 and 20, when the load bed is in its normal, raised position, as shown in Fig. 1.

To raise and lower the load bed 16, elevator mechanisms 60 are interposed between the load bed and the front and rear vehicle units 18 and 20. Only the rear elevator mechanism 60 need be described, since the two mechanisms may be identical. Portions of the rear elevator mechanism 60 are mounted on the load bed 16 and the vehicle unit 20. Thus, a double wedge 62 (Figs. 6 and 9) is formed on the rear load bed portion 48. It will be seen that the double wedge 62 is generally V-shaped and is arranged to taper downwardly toward the center of the load bed 16. More specifically, the double wedge 62 is provided with downwardly facing wedge surfaces 64 and 66 which are inclined downwardly toward the center of the load bed.

To cooperate with the double wedge 62, a pair of single wedges 68 and 70 are mounted on the rear vehicle unit 20. Oppositely inclined, upwardly facing wedge surfaces 72 and 74 are provided on the wedges 68 and 70 to engage the downwardly facing wedge surfaces 64 and 66. The wedges 68 and 70 are mounted for horizontal movement on a guide rail 76 secured to the rear vehicle unit 20.

It will be apparent that movement of the single wedges 68 and 70 toward and away from each other will raise and lower the double wedge 62. To effect such movement of the single wedges, a lead screw 78 is journalled in the rear vehicle unit 20. Threaded portions 80 and 82 of opposite pitch are formed on the opposite ends of the screw 78 and are threaded through the wedges 68 and 70. An electric motor 84, or some other source of motive power, is preferably mounted on the rear vehicle unit 20 to rotate the lead screw 78. It will be understood that the lead screw may be arranged for manual operation, if this is desired. The illustrated motor 84 may be connected to the screw by any suitable means, such as interengaging worm and worm wheel elements 86 and 88, as shown in Fig. 10. The worm wheel 88 may be mounted centrally on the lead screw 78.

Figure 5:
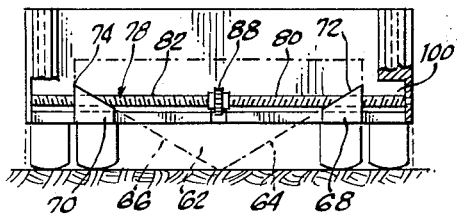

The motors 84 on the front and rear vehicle units 18 and 20 are preferably wired together into a single circuit for common operation. It will be apparent that energizing the motors 84 in one direction will rotate the lead screw 78 and thereby move the wedges 68 and 70 apart. Due to the wedging cooperation between the single wedges 68 and 70 and the double wedge 62, the load bed 16 will be lowered until it engages the ground, as shown in Fig. 2. The single wedges 68 and 70 will then be fully spread apart, as shown in Fig. 5. With the load bed 16 thus lowered, heavy machinery or other equipment may readily be driven or otherwise placed on the load bed. Because of the minimum height of the load bed, a minimum of lifting will be involved in loading the equipment.

The load bed 16 may be raised by reversing the motors 84 so that the wedges 68 and 70 will be moved toward each other. With the load bed fully raised, the wedges will assume the position shown in Fig. 4. The tractor 14 may then be utilized to tow the trailer 12 along the highways. Unloading of the equipment from the load bed may be facilitated by again lowering the bed to the ground.

While the T-guides 54 and 56 permit vertical movement of the load bed, they prevent angular movement between the load bed and the vehicle members. Accordingly, the load bed is equivalent to a rigid connection between the front and rear vehicle members. The antifriction rollers 58 prevent binding between the interengaging T- guides.

It will be understood that the means for raising and lowering the load bed 16 in the modified embodiment of Fig. 3 may be the same as in the embodiment of Figs. 1 and 2. In this instance, the load bed 16, when fully raised, acts as a rigid connection between the power unit 36 and the rear wheel unit 38 of the truck 34. Thus the truck may be used in the normal manner in hauling equipment supported on the load bed.

With the adjustable load bed of the present invention, the height of the bed or deck may be adjusted to correspond with that of a loading dock, or the like. This greatly facilitates the shifting of equipment between the dock and the bed. Moreover, the bed may readily be loaded from the side of the vehicle. Such loading, between a loading dock and the side of the bed, is particularly advantageous when the invention is applied to a cargo-type bed.

It is possible to disconnect the load bed entirely from either or both of the front and rear members 18 and 20. In this way, the gooseneck 30 may be removed from the bed 16. Moreover, the bed may be removed and replaced with another bed of a different type.

To remove the front support 18 and gooseneck 30, the bed 16 is lowered to the ground in the manner already described. This involves moving the front wedges 68 and 70 away from each other. With the bed on the ground, the wedges 68 and 70 are spread apart still farther to disengage them from the front double wedge 62. When fully spread apart, the wedges 68 and 70 are received in lateral openings or recesses 100 formed in both the front and rear supporting units 18 and 20. The single wedges 68 and 70 are entirely clear of the double wedge 62, when the single wedges are fully spread apart. Consequently, the front support 18 and gooseneck 30 may be lifted off the bed 16. The rear supporting unit 20 may be removed in similar fashion.

Various other modifications, alternative constructions and equivalents may be employed without departing from the true spirit and scope of the invention as exemplified in the foregoing description and defined in the following claims.

I claim:

1. In a load-carrying vehicle, the combination comprising a horizontal bed for carrying a load, front and rear vehicle members connected to the front and rear of said bed for carrying said bed, at least one of said members having wheels thereon, said bed having front and rear end portions with vertically extending slots therein, said front and rear vehicle members having vertically extending guides slidably retained in said respective slots for guiding said bed for vertical movement relative to said members, each of said end portions having a V-shaped double wedge thereon with a pair of downwardly facing wedge surfaces inclined downwardly and inwardly, each of said vehicle members having a pair of single wedges with upwardly facing inclined surfaces engaging said downwardly facing surfaces in wedging relation thereto, means on each of said members supporting each of said single wedges for horizontal movement, screw means on each of said members for moving said single wedges toward and away from each other, and power means on each of said members for actuating said screw means to raise and lower said bed relative to said vehicle members.

2. In a load-carrying vehicle, the combination comprising a horizontal bed for carrying a load, front and rear vehicle members connected to the front and rear of said bed for carrying said bed, at least one of said members having wheels thereon, said bed having front and rear end portions with vertically extending T-slots therein, said front and rear vehicle members having vertically extending T-guides slidably received in said respective T-slots for guiding said bed for vertical movement relative to said members, said end portions having anti-friction rollers thereon mounted in said T-slots for engaging said T-guides, each of said end portions having a V-shaped double wedge thereon with a pair of downwardly facing wedge surfaces inclined downwardly and inwardly, each of said vehicle members having a pair of single wedges with upwardly facing inclined surfaces engaging said downwardly facing surfaces in wedging relation thereto, means on each of said members supporting each of said single wedges for horizontal movement, screw means on each of said members for moving said single wedges toward and away from each other, and power means on each of said members for actuating said screw means to raise and lower said bed relative to said vehicle members.

3. In a load-carrying vehicle, the combination comprising a horizontal bed for carrying a load, front and rear vehicle members connected to the front and rear of said bed for carrying said bed, said members having wheels thereon, at least one of said members having power means for driving said wheels thereon, said bed having front and rear end portions with vertically extending T-slots therein, said front and rear vehicle members having vertically extending T-guides slidably received in said respective T-slots for guiding said bed for vertical movement relative to said members, each of said end portions having a V-shaped double wedge thereon with a pair of downwardly facing wedge surfaces inclined downwardly and inwardly, each of said vehicle members having a pair of single wedges with upwardly facing inclined surfaces engaging said downwardly facing surfaces in wedging relation thereto, means on each of said members supporting each of said single wedges for horizontal movement, screw means on each of said members for moving said single wedges toward and away from each other, and power means on each of said members for actuating said screw means to raise and lower said bed relative to said vehicle members.

4. In a load-carrying semi-trailer vehicle, the combination comprising a horizontal bed for carrying a load, front and rear vehicle members connected to the front and rear of said bed for carrying said bed, said rear member having wheels thereon, said front member having hitch means for connecting said semi-trailer vehicle to a tractive vehicle, said bed having front and rear end portions with vertically extending T-slots therein, said front and rear vehicle members having vertically extending T-guides slidably received in said respective T-slots for guiding said bed for vertical movement relative to said members, each of said end portions having a V-shaped double wedge thereon with a pair of downwardly facing wedge surfaces inclined downwardly and inwardly, each of said vehicle members having a pair of single wedges with upwardly facing inclined surfaces engaging said downwardly facing surfaces in wedging relation thereto, means on each of said members supporting each of said single wedges for horizontal movement, screw means on each of said members for moving said single wedges toward and away from each other, and power means on each of said members for actuating said screw means to raise and lower said bed relative to said vehicle members.

5. In a load-carrying vehicle, the combination comprising a generally horizontal bed for carrying a load, a pair of members connected to opposite ends of said bed for supporting the same, at least one of said members having wheels thereon, each end of said bed and each of said members having a pair of vertically extending interlocking male and female guide elements for guiding said bed for vertical movement relative to said members, each of said members and each end of said bed having a pair of interengaging elevator means thereon for raising and lowering said bed relative to said members, one of said elevator means including a double wedge having a pair of oppositely inclined downwardly facing wedge surfaces, the other of said elevator means including a pair of single wedges having upwardly facing inclined surfaces engaging said downwardly facing surfaces, means supporting said single wedges for horizontal movement, and means for moving said single wedges toward and away from each other and thereby raising and lowering said double wedge.

6. In a load-carrying vehicle, the combination comprising a generally horizontal bed for carrying a load, a pair of members connected to opposite ends of said bed for supporting the same, at least one of said members having wheels thereon, each end of said bed and each of said members having a pair of vertically extending interengaging male and female guide elements for guiding said bed for vertical movement relative to said members, each of said members and each end of said bed having a pair of interengaging elevator means thereon for raising and lowering said bed relative to said members, one of said elevator means including a V-shaped downwardly tapering double wedge having a pair of inclined downwardly facing wedge surfaces, the other of said elevator means including a pair of single wedges having downwardly facing inclined surfaces engaging said downwardly facing surfaces, means supporting said single wedges for horizontal movement, screw means threadedly engaging said single wedges for moving them toward and away from each other and thereby raising and lowering said double wedge, and means for actuating said screw means in opposite directions to raise and lower said bed.

7. In a load-carrying vehicle, the combination comprising a generally horizontal bed for carrying a load, a pair of members connected to opposite ends of said bed for supporting the same, at least one of said members having wheels thereon, each end of said bed and each of said members having a pair of vertically extending interengaging male and female guide elements of T-shaped cross section for guiding said bed for vertical movement relative to said members, one guide element of each pair of interengaging guide elements having anti-friction roller means thereon engaging the other element of said pair, each of said members and each end of said bed having a pair of interengaging elevator means thereon for raising and lowering said bed relative to said members, one of said elevator means including a V-shaped downwardly tapering double wedge having a pair of inclined downwardly facing wedge surfaces, the other of said elevator means including a pair of single wedges having upwardly facing inclined surfaces engaging said downwardly facing surfaces, means supporting said single wedges for horizontal movement, screw means threadedly engaging said single wedges for moving them toward and away from each other and thereby raising and lowering said double wedge, and means for actuating said screw means in opposite directions to raise and lower said bed.

8. In a load-carrying vehicle, the combination comprising a generally horizontal bed for carrying a load, a pair of members connected to opposite ends of said bed for supporting the same, said members having wheels thereon, at least one of said members having power means for driving said wheels thereon, each end of said bed and each of said members having a pair of vertically extending interengaging male and female guide elements of T-shaped cross section for guiding said bed for vertical movement relative to said members, each of said members and each end of said bed having a pair of interengaging elevator means thereon for raising and lowering said bed relative to said members, one of said elevator means including a pair of inclined downwardly facing wedge surfaces, the other of said elevator means including a pair of single wedges having upwardly facing inclined surfaces engaging said downwardly facing surfaces, means supporting said single wedges for horizontal movement, screw means threadedly engaging said single wedges for moving them toward and away from each other and thereby raising and lowering said double wedge, and means for actuating said screw means in opposite directions to raise and lower said bed.

9. In a load-carrying semi-trailer vehicle, the combination comprising a generally horizontal bed for carrying a load, a pair of members connected to opposite ends of said bed for supporting the same, one of said members having hitch wheels thereon, the other of said members having hitch means thereon for coupling said semi-trailer vehicle to a tractive vehicle, each end of said bed and each of said members having a pair of vertically extending interengaging male and female guide elements of T-shaped cross-section for guiding said bed for vertical movement relative to said members, each of said members, and each end of said bed having a pair of interengaging elevator means thereon for raising and lowering said bed relative to said members, one of said elevator means including a V-shaped downwardly tapering double wedge having a pair of inclined downwardly facing wedge surfaces, the other of said elevator means including a pair of single wedges having upwardly facing inclined surfaces engaging said downwardly facing surfaces, means supporting said single wedges for horizontal movement, screw means threadedly engaging said single wedges for moving them toward and away from each other and thereby raising and lowering said double wedge, and means for actuating said screw means in opposite directions to raise and lower said bed.

References Cited in the file of this patent

UNITED STATES PATENTS

| | | |
|---|---|---|
| 1,340,418 | Schneider | May 18, 1920 |
| 2,560,715 | Bill | July 17, 1951 |
| 2,653,827 | Manning | Sept. 29, 1953 |